United States Patent
Xu

(10) Patent No.: US 7,072,195 B2
(45) Date of Patent: Jul. 4, 2006

(54) MODULAR AC VOLTAGE SUPPLY AND ALGORITHM FOR CONTROLLING THE SAME

(75) Inventor: Renjie Xu, Newark, CA (US)

(73) Assignee: Xantrex Technology Inc., Burnaby (CA)

( * ) Notice: Subject to any disclaimer, the term of this patent is extended or adjusted under 35 U.S.C. 154(b) by 0 days.

(21) Appl. No.: 10/505,488

(22) PCT Filed: Feb. 25, 2002

(86) PCT No.: PCT/US02/08976

§ 371 (c)(1),
(2), (4) Date: Jan. 12, 2005

(87) PCT Pub. No.: WO03/073190

PCT Pub. Date: Sep. 4, 2003

(65) Prior Publication Data

US 2005/0117375 A1    Jun. 2, 2005

Related U.S. Application Data

(60) Provisional application No. 60/359,431, filed on Feb. 22, 2002.

(51) Int. Cl.
*H02M 7/5387* (2006.01)

(52) U.S. Cl. .......................................... 363/95; 363/98
(58) Field of Classification Search ............... 363/95, 363/98
See application file for complete search history.

(56) References Cited

U.S. PATENT DOCUMENTS

| 3,619,749 A | 11/1971 | Schieman |
| 4,728,806 A | 3/1988 | Baker et al. |
| 5,097,193 A | 3/1992 | Neis et al. |
| 5,351,178 A * | 9/1994 | Brennen et al. ............... 363/40 |
| 5,369,353 A * | 11/1994 | Erdman ....................... 323/207 |
| 5,384,696 A * | 1/1995 | Moran et al. ................. 363/40 |
| 5,436,512 A | 7/1995 | Inam et al. |
| 5,483,463 A | 1/1996 | Qin et al. |
| 5,596,492 A | 1/1997 | Divan et al. |
| 6,118,680 A | 9/2000 | Wallace et al. |
| 6,169,669 B1 | 1/2001 | Choudhury |
| 6,297,977 B1 | 10/2001 | Huggett et al. |
| 6,404,655 B1 * | 6/2002 | Welches ....................... 363/41 |

OTHER PUBLICATIONS

Chandorkar, M.C., et al., "Control of Parallel Connected Inverters in Standalone ac Supply Systems," *IEEE Transactions on Industry Applications* 29(1):136-143, Jan./Feb. 1993.

Chandorkar, M.C. et al., "Novel Architectures and Control for Distributed UPS Systems," *APEC '94 Ninth Annual Applied Power Electronics Conference and Exposition*, IEEE Power Electronics Society, the IEEE Industry Applications Society, and Power Sources Manufacturers Association, Orlando, Florida, Feb. 13-17, 1994, pp. 683-689.

Irwin, J.D. (editor-in-chief), *Industrial Electronics Handbook*, CRC Press/IEEE Press (1997), particularly pp. 263-273 and 367-376.

* cited by examiner

*Primary Examiner*—Jeffrey Sterrett
(74) *Attorney, Agent, or Firm*—Christensen O'Connor Johnson Kindness PLLC

(57) ABSTRACT

An AC power supply (10) can be connected in parallel with similar supplies to drive loads (16). Each of the AC power supplies (10) incorporates a discrete controller functioning based on parameters sensed locally and without reference to any of the other supplies.

2 Claims, 12 Drawing Sheets

Control Block of Parallel Operating AC Supply

Relationship among stationary α–β frame and forwards Rotating P-Q frame and backfards rotating R-S frame

MODULAR AC VOLTAGE SUPPLY AND ALGORITHM FOR CONTROLLING THE SAME

CROSS-REFERENCE TO RELATED APPLICATION

The application claims the benefit of U.S. Provisional Application No. 60/359,431, filed Feb. 22, 2002, the benefit of which is hereby claimed under 35 U.S.C. §119.

FIELD OF THE INVENTION

The present invention relates to AC voltage supply systems, particularly uninterruptible power supply (UPS) systems that can be connected in parallel to share power to one or more loads.

BACKGROUND OF THE INVENTION

The following publications and patents describe AC supply systems, uninterruptible power supplies, parallel operation of AC generators, and other aspects related to the present invention:
(1) Chandorkar, M. C., et al., "Control of Parallel Connected Inverters in Standalone ac Supply Systems," *IEEE Transactions on Industry Applications* 29(1): 136–143, January/February 1993.
(2) Chandorkar, M. C., et al., "Novel Architectures and Control for Distributed UPS Systems," *APEC '94 Ninth Annual Applied Power Electronics Conference and Exposition*, IEEE Power Electronics Society, the IEEE Industry Applications Society, and Power Sources Manufacturers Association, Orlando, Fla., Feb. 13–17, 1994, pp. 683–689.
(3) U.S. Pat. No. 5,596,492, issued Jan. 21, 1997, to Divan et al., "Method and Apparatus for De-Centralized Signal Frequency Restoration in a Distributed UPS System."
(4) U.S. Pat. No. 6,118,680, issued Sep. 12, 2000, to Wallace et al, "Methods and Apparatus for Load Sharing Between Parallel Inverters in an AC Power Supply."
(5) U.S. Pat. No. 5,436,512, issued Jul. 25, 1995, to Inam et al., "Power Supply with Improved Circuit for Harmonic Paralleling."
(6) U.S. Pat. No. 6,169,669, issued Jan. 2, 2001, to Choudhury, "Digital Signal Processor Controlled Uninterruptable Power Supply."
(7) U.S. Pat. No. 5,483,463, issued Jan. 8, 1996, to Qin et al., "Uninterruptible Power Supply (UPS) and Method."
(8) U.S. Pat. No. 6,297,977, issued Oct. 2, 2001, to Huggett et al., "Parallel Operation of Multiple Generators."
(9) J. David Irwin (editor-in-chief), Industrial Electronics Handbook, CRC Press/IEEE Press (1997), particularly 263–273 and 367–376.

SUMMARY OF THE INVENTION

The present invention provides a modular AC supply that can be connected in parallel to drive loads. For example, a 1 MW load could be driven by ten 100 kW modular systems. A potential problem of parallel operation is instability and coordination of operation and the outputs of the modules. An advantage of the present invention is that communication lines between the supply modules is not required. Rather, each supply incorporates a discrete controller functioning based on parameters sensed locally and without reference to other supplies.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The primary purpose of an uninterruptible power supply (UPS) is to provide conditioned, continuous power to one or more loads. With the proliferation of electronic loads like computers, the incidence of power quality-related problems is growing. Similarly, sensitive communication equipment, such as cellular telephone cell sites, may typically be powered by a utility AC power grid, but it is necessary or desirable that uniformly conditioned power continue to be supplied if grid power is interrupted or degrades. Preferably, the UPS system will provide backup power by way of battery strings or another DC generator in the case of utility power outages, and will also correct for high and low power events (surges and sags).

Figure 1:
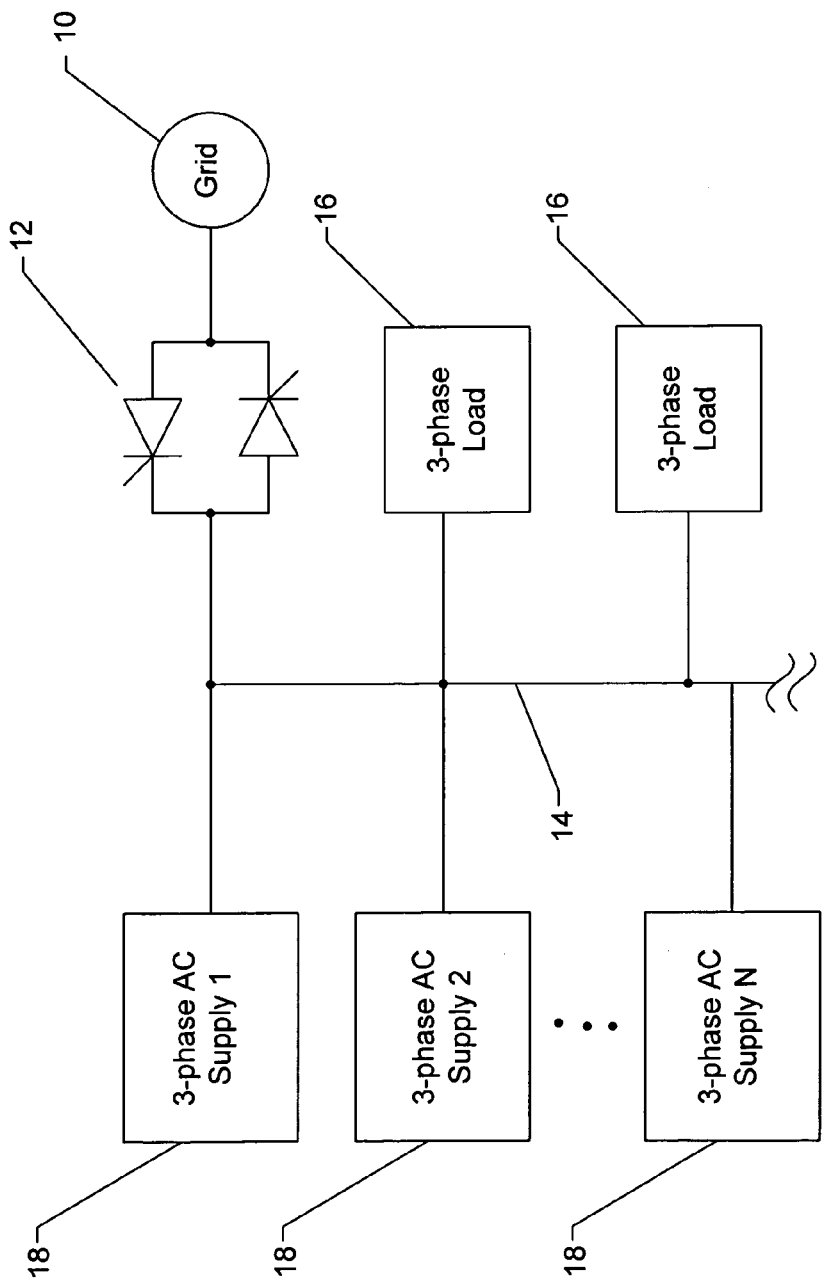
FIG. 1 is a block diagram of a line-interactive UPS system.
Figure 2:
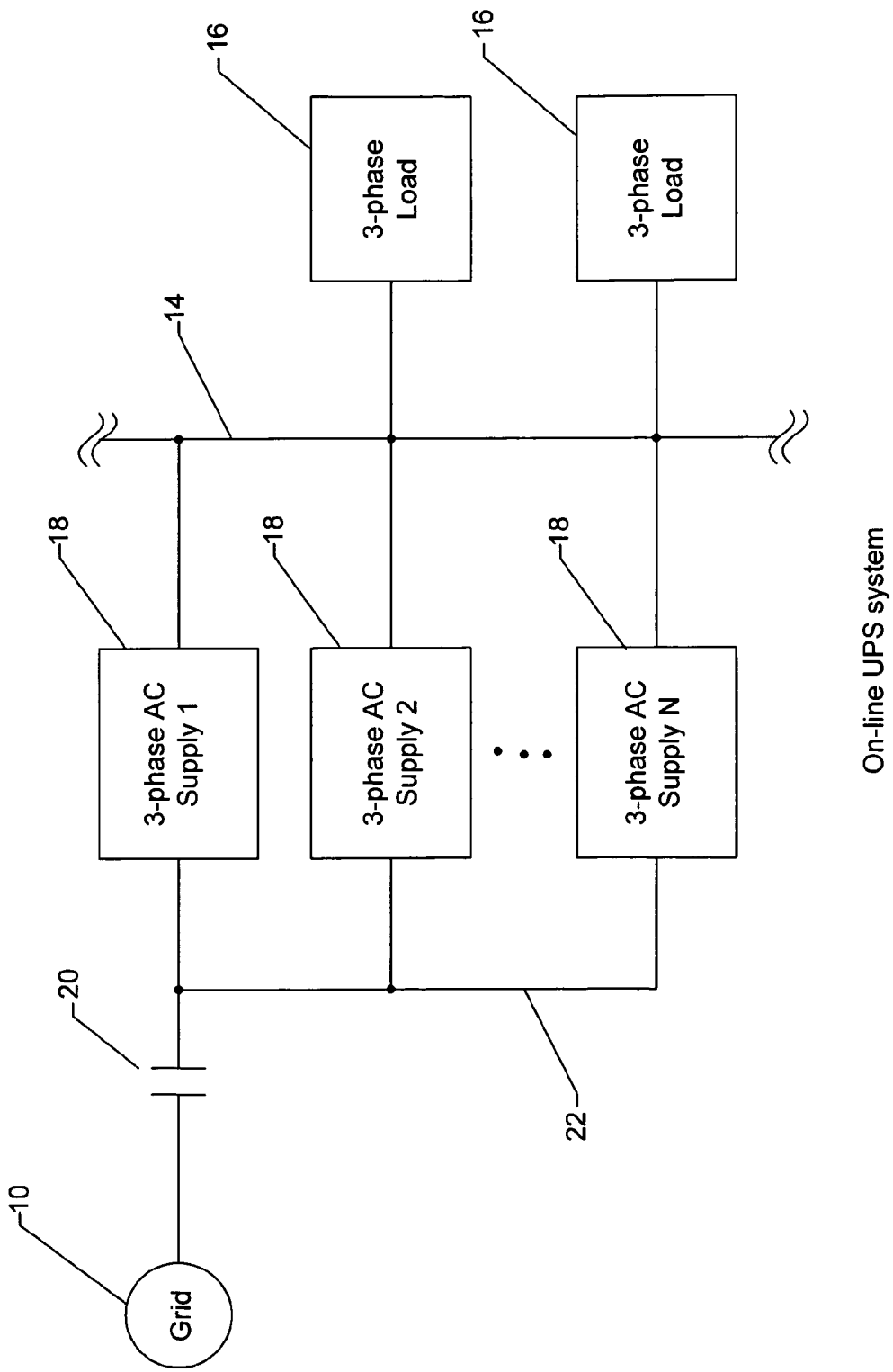
FIG. 2 is a block diagram of an on-line UPS system.

Two general types of UPS systems are illustrated in FIGS. 1 and 2. In the "line-interactive" system (FIG. 1) the utility AC source 10 can supply power by way of a filter or transformer 12 to the AC bus 14. In normal operation, power to one or more loads 16 is conveyed directly from bus 14. One or more UPS modules 18 are provided to achieve the functions described above, namely, supplying power to the bus during an interruption of power from the utility, and correcting for surges, sags, or other irregularities. The inverter of the UPS module(s) does not support the load(s) unless there is a power outage, or the AC input falls outside specified tolerances. It is the ability of the inverter(s) to interact with the line that gets the line-interactive UPS its name.

In the "on-line" system represented in FIG. 2, also known as a "double conversion" UPS, the power from the grid 10 is converted to a DC voltage by a rectifier 20. The DC voltage is supplied along a DC bus 22 to one or more of the UPS modules 18 which invert the DC voltage to provide an AC output to the AC bus 14. The inverters of the UPS modules support the load and provide regulation of the output voltage and frequency. In the event that grid power is lost or deviates from the specified tolerances, the inverters of the UPS modules use backup DC sources, such as batteries, as energy sources and continue operation until the backup sources are depleted or the line is restored.

Similarly, in the line-interactive UPS system of FIG. 1, backup DC sources are required to support the load in the event of line interruption or deviation from a specified input voltage and frequency. Such backup sources can include batteries, photovoltaic systems, fuel cells, or other DC generators.

In either the line-interactive or on-line system, when multiple UPS modules 18 are provided, it is desirable that such modules share the load equally or in accordance with their capacities, and their outputs should be coordinated both in voltage and frequency. In some systems, this is achieved by a "central controller" and data communication wiring between the controller of each AC supply. The central controller dictates the current sharing of the different modules based on signals received from and communicated to them. In many cases, a more desirable system is a "distributed" system in which no central controller is used and no data communication line is required between the different AC supplies. Rather, each supply has a discrete controller which adapts the unit for current sharing based on locally sensed parameters. The distributed system is particularly preferred when the supplies are located remotely, and when it is desired to add supplies such as for expansion of a power system.

Figure 3:
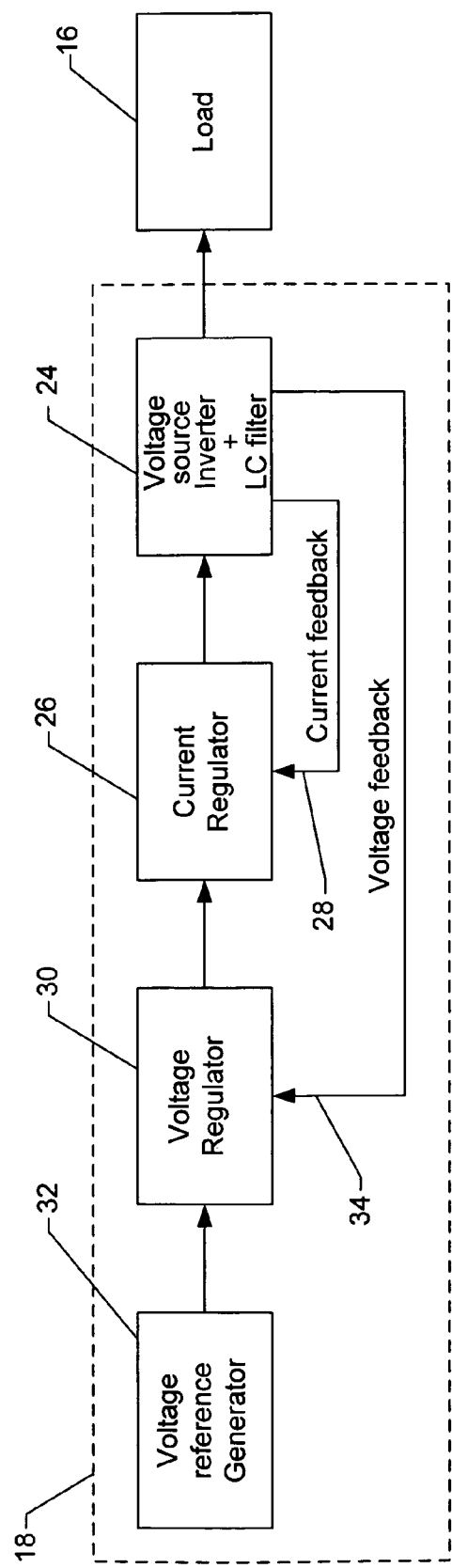
FIG. 3 is a block diagram of a modular AC voltage supply in accordance with the present invention operating as a single module.

In the present invention, as represented in FIG. 3, in the case of a single module 18 supporting a load 16, the inverter 24 (represented as also including the DC voltage source and output filter) is controlled by switching signals from a current regulator 26. The current regulator, in turn, is controlled by a feedback current signal 28 based on the sensed output current of the inverter, and control signals from a voltage regulator 30. Voltage regulator 30, in turn, is controlled based on signals from a voltage reference generator 32 and a voltage feedback signal 34 corresponding to the output voltage of the inverter.

Figure 4:
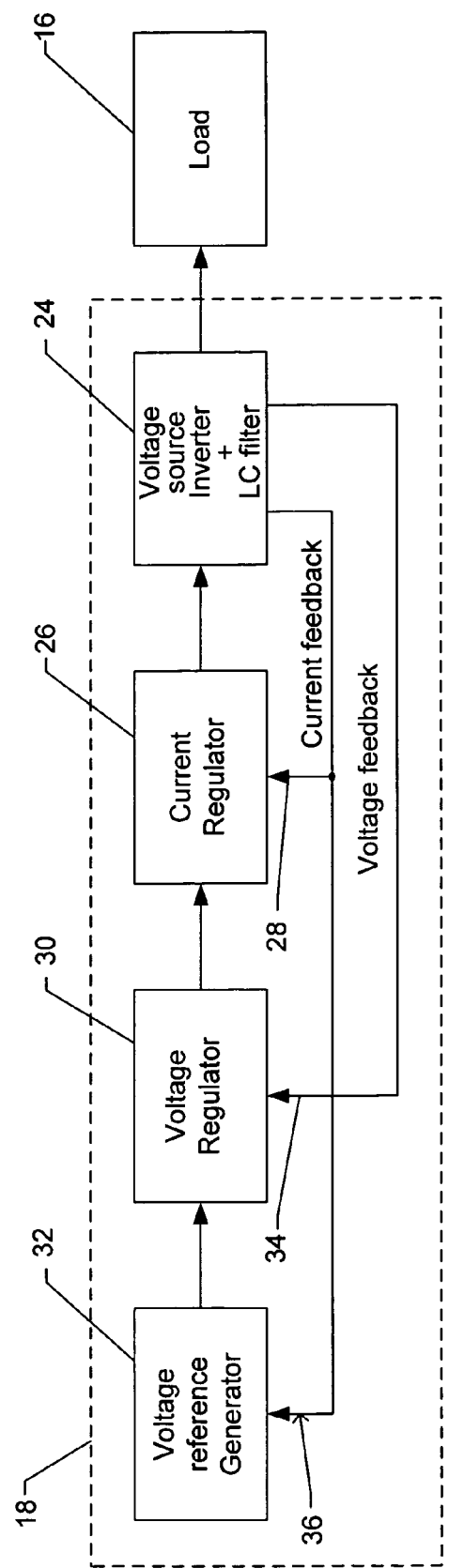
FIG. 4 is a block diagram of a modular AC voltage supply in accordance with the present invention operating in parallel.

With reference to FIG. 4, in the case of parallel units 18 supporting one or more loads 16, the voltage reference generator 32 also is controlled by a current feedback signal 36 representative of the output current of the inverter, but otherwise has the same basic block diagram of the "single" supply of FIG. 3. These components and their operation are described in more detail below.

Figure 5:
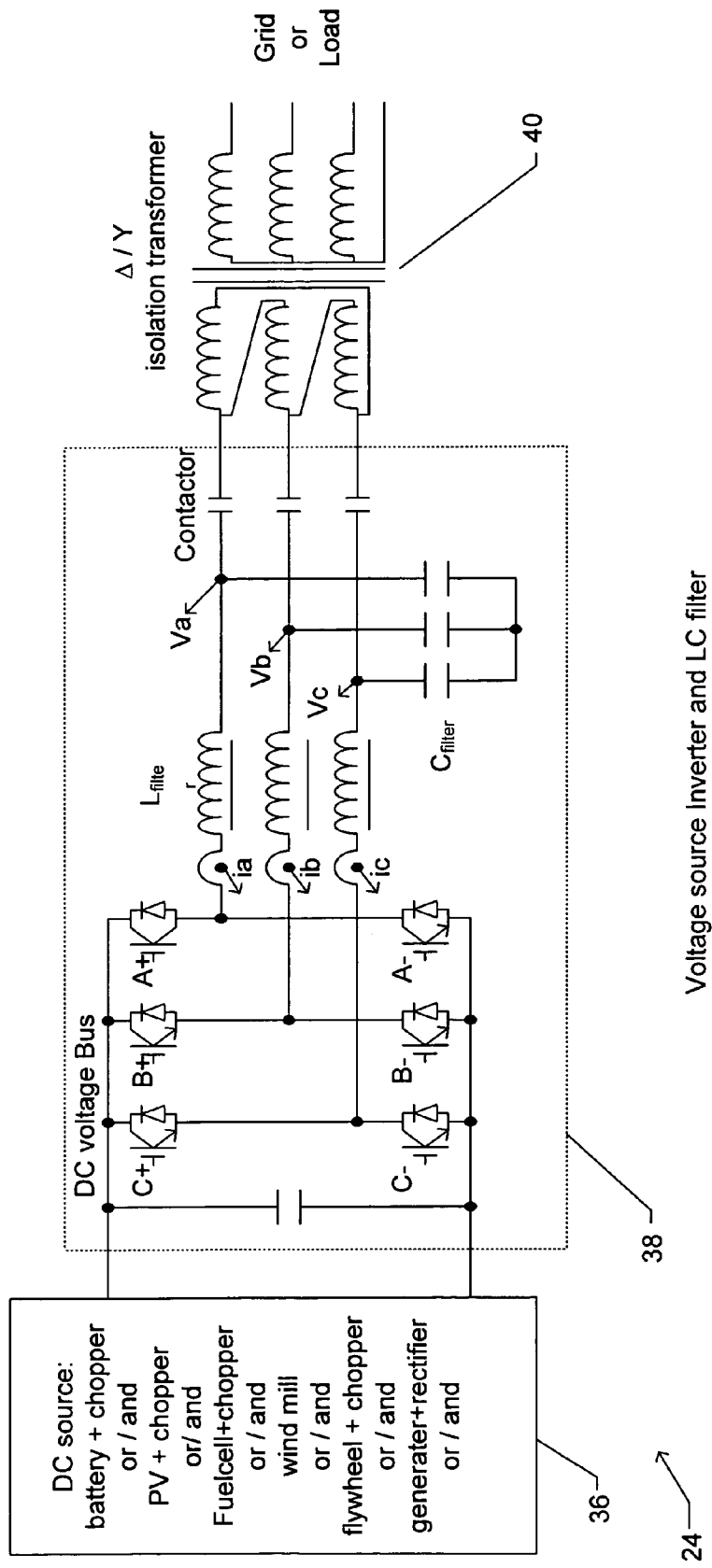
FIG. 5 is a more detailed block and circuit diagram of a voltage source, inverter and output filter usable in the present invention.

FIG. 5 illustrates the composite voltage source, inverter and filter 24. The voltage source 36 supplies DC power to the inverter 38. Power from the inverter is supplied to the AC bus by way of an isolation transformer 40. In the illustrated embodiment, a three-phase four-wire output is provided. The switches of the inverter are controlled by the signals: A+, A−; B+, B−; and C+, C−. Current sensors are incorporated to sense the output current ia, ib, and ic. Similarly, the output voltage is represented as Va, Vb and Vc.

Figure 6A:
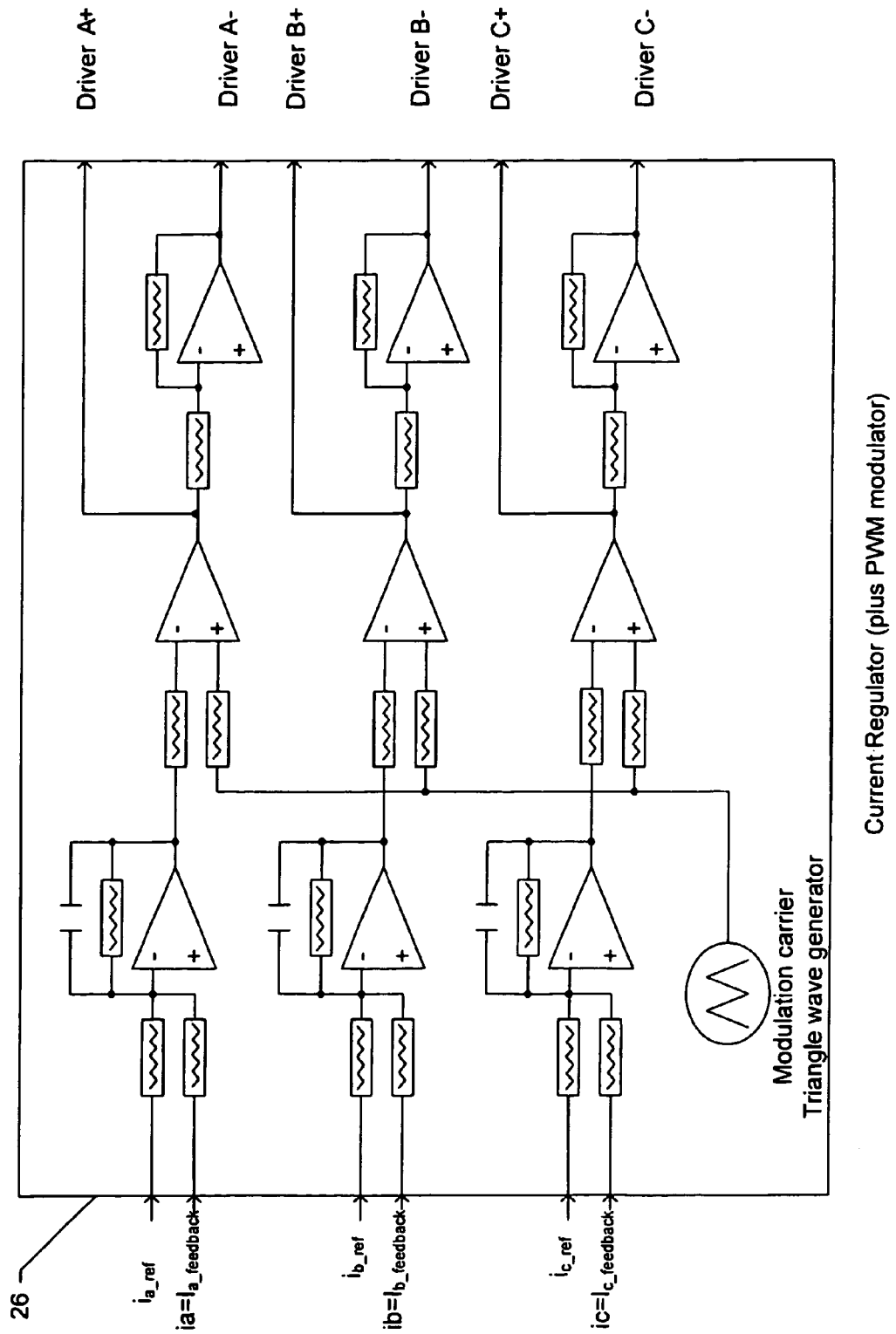
FIG. 6A is a more detailed block diagram and graph of a current regulator usable in the present invention.
Figure 6B:
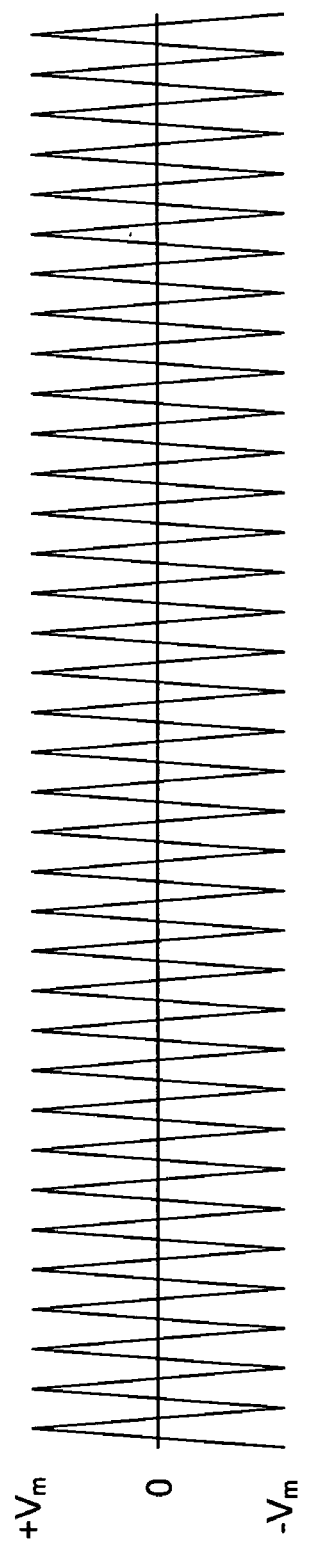
FIG. 6B is a graph of a carrier wave used in the current regulator.
Figure 7:
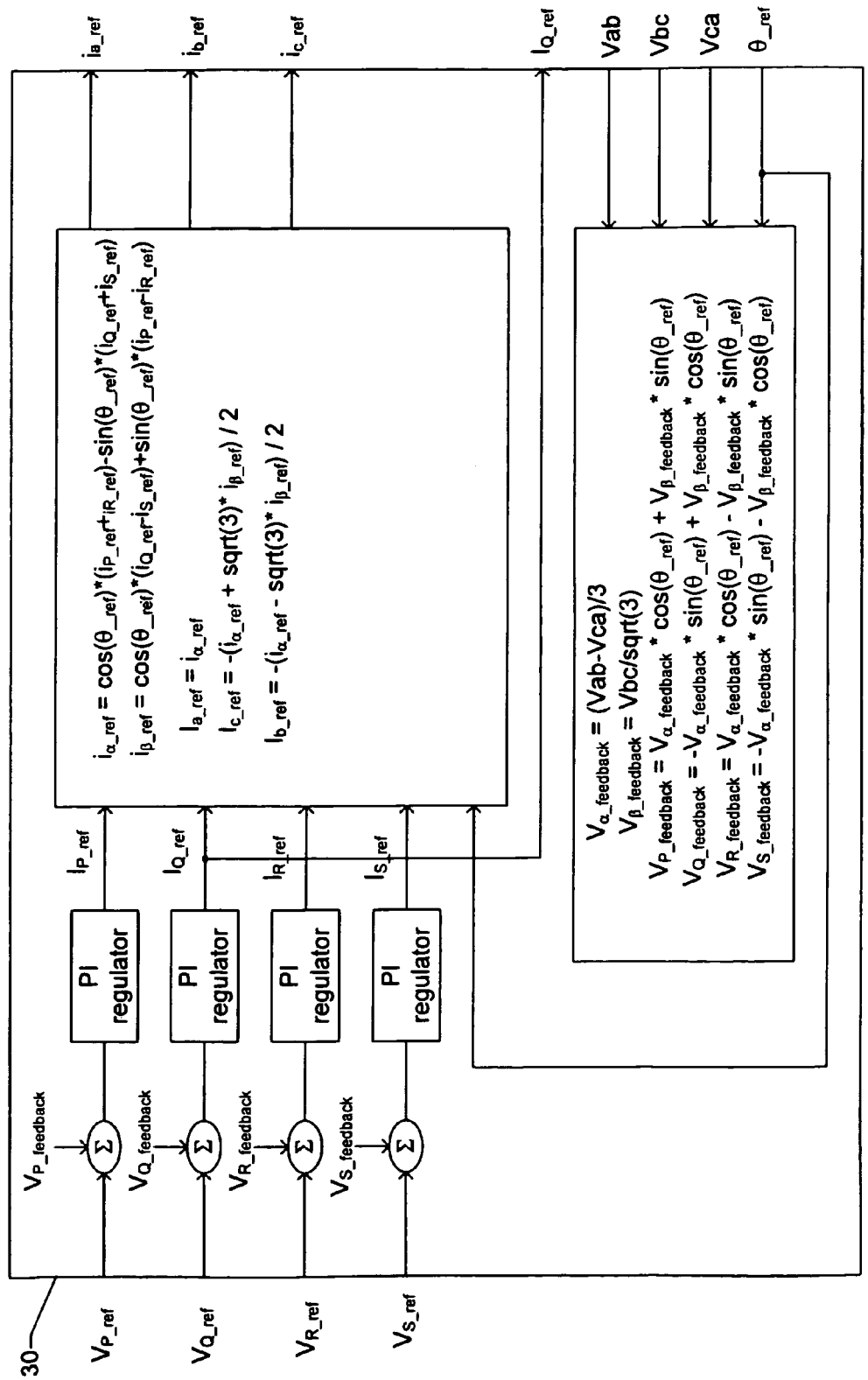
FIG. 7 is a more detailed block diagram of a control algorithm for a voltage regulator usable in the present invention.

The current regulator 26 of FIG. 3 is represented in more detail in FIG. 6A. This component supplies the drive signals for the inverter, namely A+, A−, B+, B−, C+ and C−, which control the operation of the inverter and determine the output voltage and frequency. Starting from the left of the upper diagram of FIG. 6A, the ia, ib and ic feedback signals (determined from the current sensors of the inverter) are compared to corresponding reference signals (the rectangular boxes represent resistors in this figure). The differences control the switching points for the inverter switch driver signals in conjunction with a modulation carrier triangle wave (shown in FIG. 6B). In a representative embodiment the system can be designed with a carrier wave amplitude of ±5 v. or ±10 v., and a frequency of 5 kHz. to 10 kHz. (the device switching frequency). The current reference signals (ia_ref, ib_ref, ic_ref) are supplied by the voltage regulator 30, which is represented in FIG. 7, and which, in turn, receives control signals from the voltage reference generator 32 represented in FIG. 8, as well as the current feedback signals which are indicated as ia, ib and ic in FIG. 8.

Figure 9:
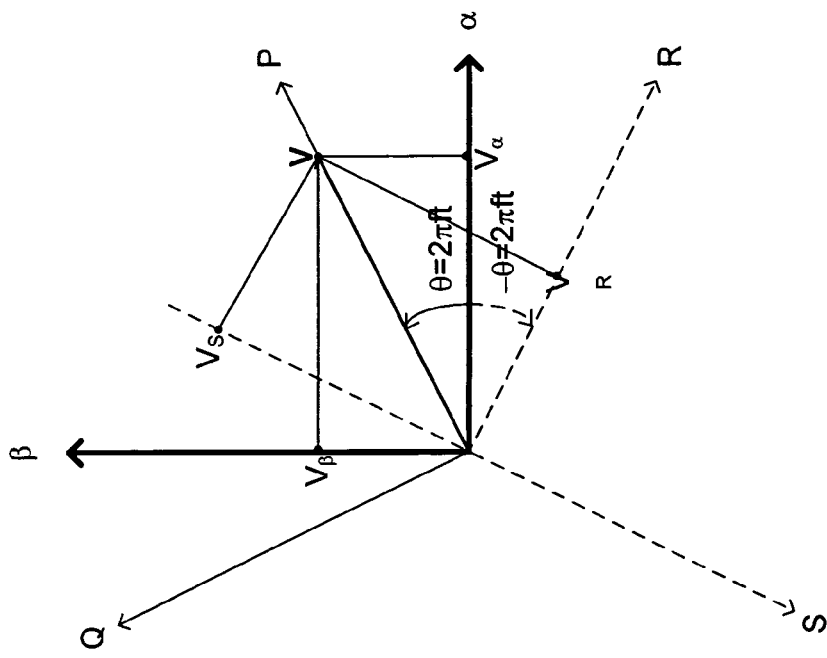
FIG. 9 is a diagram illustrating characteristics of aspects of the control algorithm usable in the present invention.

The relationships of the actual voltage and current values and the reference values are given in these figures. In addition, the relationship between the actual voltages and the α, β, P, Q, R, S values are provided in these figures. See also FIG. 9 and Annex 1 at the end of this description.

Figure 8:
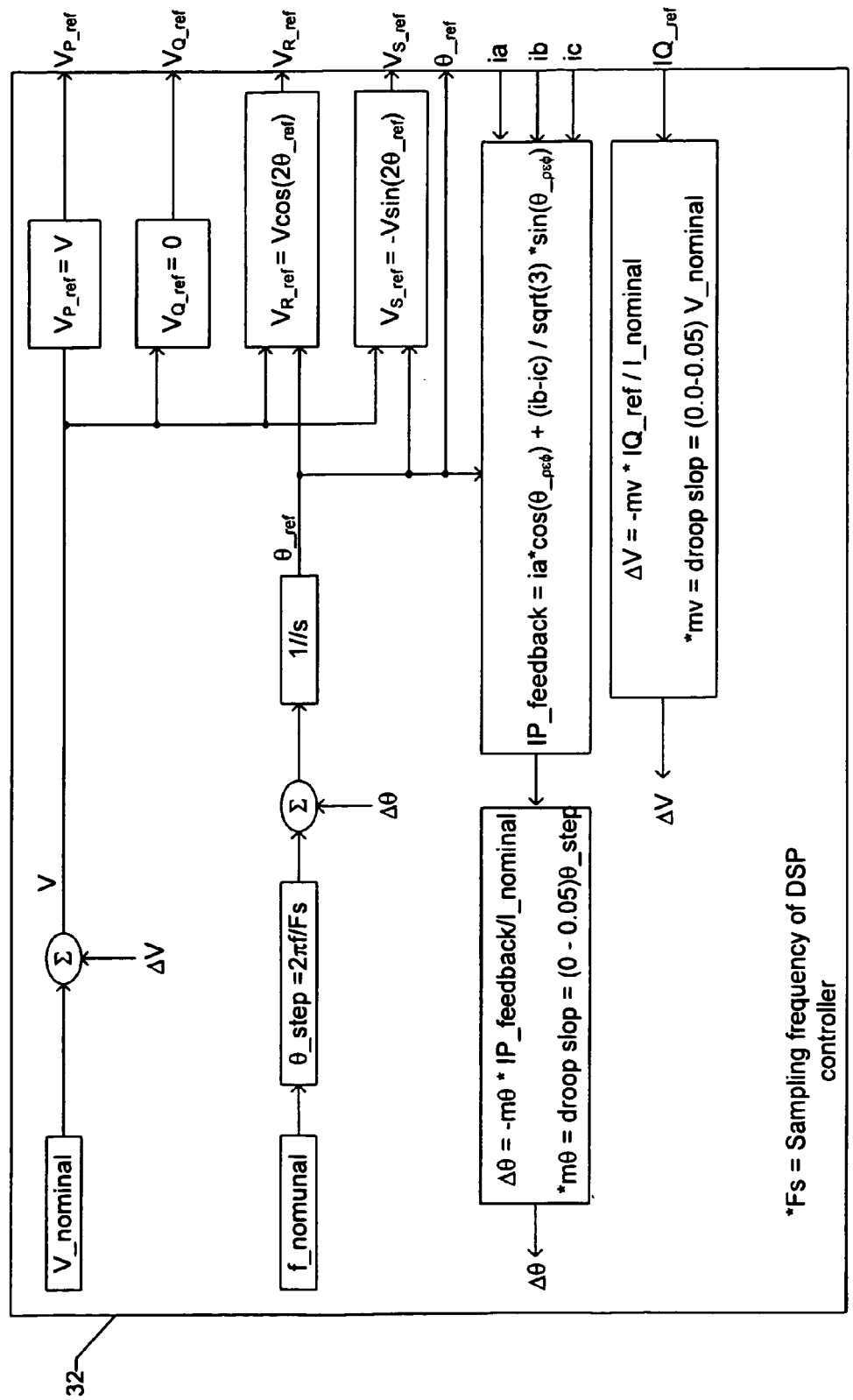
FIG. 8 is a control diagram of a control algorithm for a voltage reference generator usable in the present invention.
Figure 8A:
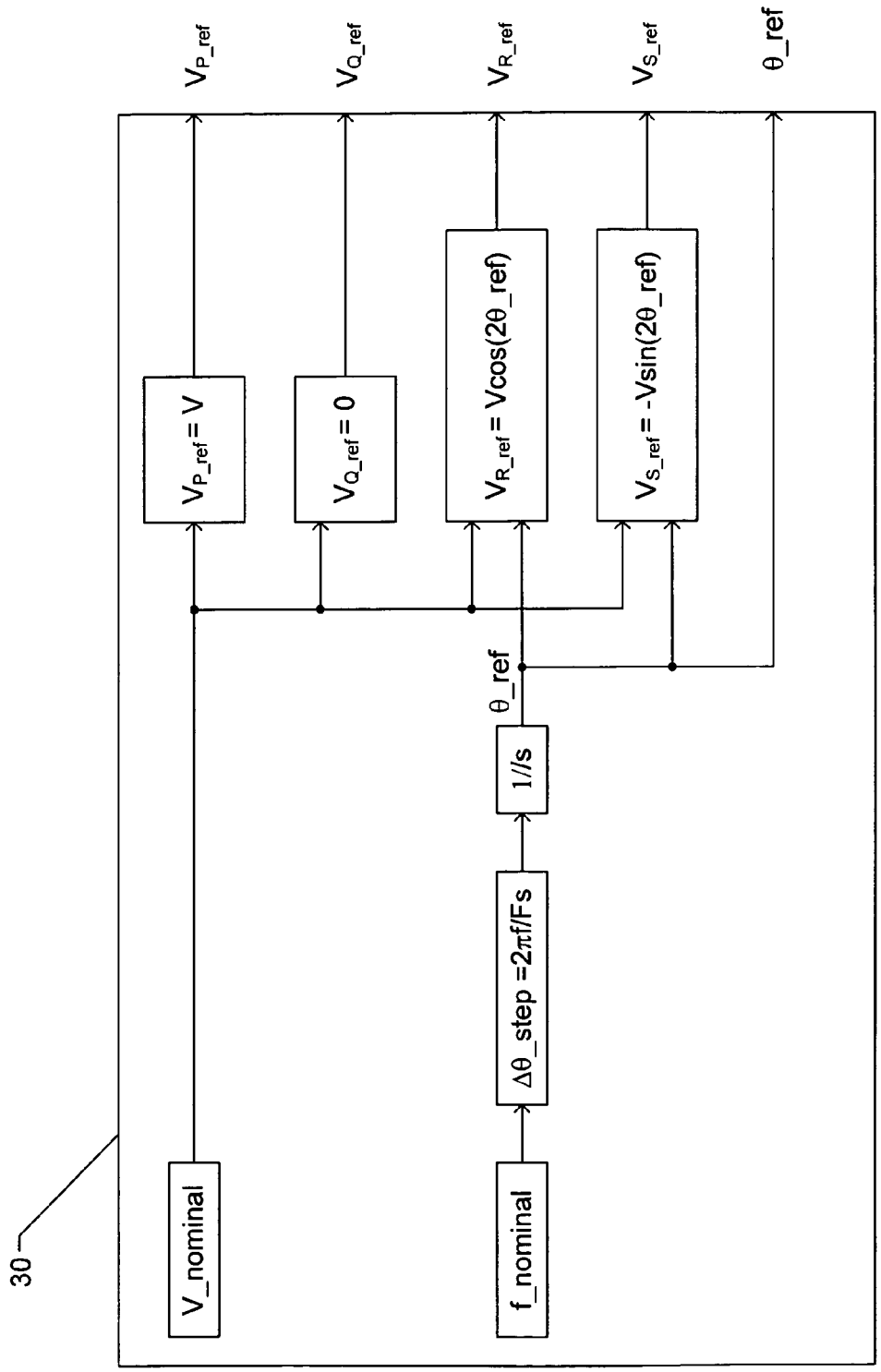
FIG. 8A is a corresponding diagram of an alternative control algorithm for a voltage reference generator usable in the present invention.

In the case of a single module, rather than paralleled modules, it is not necessary to provide current feedback to the voltage reference generator, and the system of FIG. 8A can be used rather than the system of FIG. 8.

Figure 10:
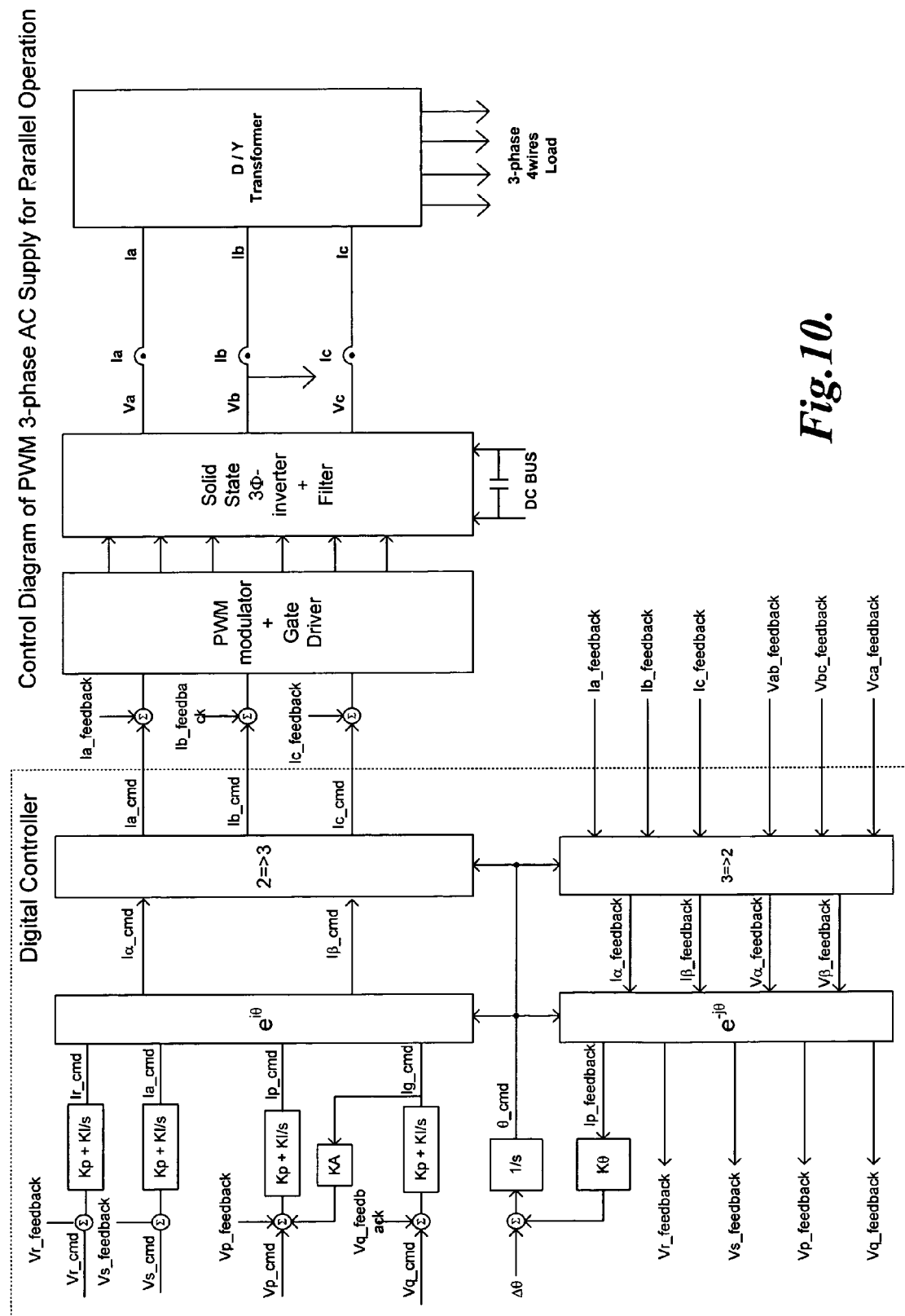
FIG. 10 is an alternative block diagram of a modular AC voltage supply in accordance with the present invention and algorithm for controlling the same.

In practice, the system is implemented with a digital controller as represented in FIG. 10 under the control of operating software for which the code is given in Annex 2.

While described with reference to UPS systems, the AC modules of the invention can be used as primary AC supplies with or without an associated utilities grid. The DC supplies for the inverters are not limited to batteries, but can include any other source of power. Without limiting the generality of the foregoing, such source can include photovoltaic arrays, batteries, wind power generators, fuel cells, flywheels, microturbines, and so on.

Annex 1

Consider the relationship among the ac power supply's output voltage, load voltage and the isolation inductor between the ac power supply and the load. Suppose that the load voltage is $V_{load}=V\sin(2\pi ft)$, the output voltage of the ac power supply is $V_{supply}=(V+\Delta V)\sin(2\pi ft+\Delta\theta)$, and $L_f$ may be the leakage inductance of an isolation transformer. Here the V is the amplitude of the voltage, the f is the voltage frequency, $\Delta V$ is the voltage amplitude difference between load side and the ac power supply side. $2\pi ft$ is the phase angle of the load voltage and $\Delta\theta$ is the angle difference between load side voltage and the power supply side voltage. Then the current through the inductor is $$i(L_f)=i_P+i_Q,$$

$$i_P=V/(2\pi f^*L_f)^*[(1+\Delta V/V)^*\sin(\Delta\theta)]^*\sin(2\pi ft),$$

it is the real power current because it is in the phase with the voltage, and $$i_Q=V/(2\pi f^*L_f)^*[(1-\cos(\Delta\theta)-\Delta V/V^*\cos(\Delta\theta)]^*\cos(2\pi ft),$$

it is the reactive current because it has 90 degrees angle shift respect to the voltage. The above relationship reveals that the current $i_P$ and $i_Q$ can be controlled by controlling the $\Delta V$ and $\Delta\theta$. In contrary, $\Delta V$ and $\Delta\theta$ can also be calculated from measured Ip and $I_Q$.

Normally, $\Delta V/V$ is less than 0.05, and $\Delta\theta$ is less than 3 degree or 0.05 radians because $L_f$ is small. In this case, real power $i_P$ is mainly determined by $\Delta\theta$, and the reactive power $i_Q$ is mainly decided by $\Delta V$.

Because $\theta$ is the integral of frequency with respect to the time, $\Delta\theta$ can be reached by change of the frequency f of the ac power supply. The droop characteristics of $i_P$-f and $i_Q$-V are the known fundamental current sharing control principle.

A 3-phase voltage system can be represented by a voltage vector $V_{\alpha-\beta}$ (see FIG. 9) in a stationary $\alpha$-$\beta$ frame(some one call it d-q frame).

$$V_{\alpha-\beta}=\tfrac{2}{3}*\{V_{an}(t)+V_{bn}(t)*A+V_{cn}(t)*A^2\}=V_\alpha+jV_\ominus,$$

Where $A=e^{-j2\pi/3}$

The trace of the tip of voltage vector $V_{\alpha-\beta}$ of a balanced 3-phase voltage should be a circle with amplitude of V and rotates at the angle speed of $2\pi f$, and the phase angle of the $V_{an}$ is $\theta=2\pi ft=\mathrm{atan}^{-1}(V_\beta/V_\alpha)$.

The voltage control of a 3-phase system is normally not in the physical a-b-c frame but in a rotating P-Q frame. The axis P overlaps the vector $V_{\alpha-\beta}$. The 3-phase voltage system can be presented also by a vector $V_{P-Q}$ in P-Q frame.

$$V_{P-Q}=V_P+jV_Q$$

$$V_P=V_\alpha*\cos(\theta)+V_\beta*\sin(\theta)$$

$$V_Q=-V_\alpha*\sin(\theta)+V_\beta*\cos(\theta)$$

For an ideal 3-phase voltage system, $V_Q$ should be zero, $V_P$-$Q$=$V_P$, and it is a constant.

In the same way, a 3-phase current can be presented by vector $I_{\alpha-\beta}=I_\alpha+jI_\beta$ in the stationary $\alpha$-$\beta$ frame and $I_{P-Q}=I_P+jI_Q$ in the rotating P-Q frame. $I_P$ represents the real power current and $I_Q$ represents the reactive current. The power factor is $\cos(\Phi)$, $\Phi=\mathrm{atan}^{-1}(I_Q/I_P)$. However, for an unbalanced 3-phase load, except the forward sequence current component, the current also has a backward sequence current. The backward sequence current component can be represented in a backward rotating R-S frame as $I_{R-S}=I_R+jI_S$.

R-S frame rotates at a same angle speed as the P_Q frame but at inverse direction, and the angle between axis R and axis P is always equal to $2\theta$. This means that a 3-phase voltage supply with an inner current control loop must control all four current components $I_P$, $I_Q$, $I_R$ and $I_S$ so that a balanced 3-phase voltage system can be realized.

For a single operating ac power supply, the reference $I_{Pref}$, $I_{Qref}$, $I_{Rref}$ and $I_{Sref}$ are created by voltage regulator $V_P$ and $V_Q$ in P-Q frame and $V_R$ and $V_S$ in R-S frame respectively. The reference $V_{Pref}=V$, $V_{Qref}=0$, $V_{Rref}=V\cos(2\theta)$ and $V_{Sref}=-V\sin(2\theta)$, where V is the nominal voltage amplitude, and $\theta=2\pi ft$.

When ac power supply operates at parallel mode, the angle $\theta$ has to be modified by $\Delta\theta$ determined by the droop of $i_d$-f curve, and the voltage amplitude V has to be modified by an adjustment $\Delta V$ determined by the droop of $i_q$-V curve. Here, $i_q$ normal is the actual sensed value. In the present invention the predicted value $i_{Q\_ref}$ is used for the drooping curve of $I_{Qref}$-V. The use of the predicted value $i_{Q\_ref}$ helps stablitiy of parallel operation.

The 3-phase ac power supply has a DSP based controller with an inner current-loop and an outer voltage-loop control. It works for either on-line UPS system or line-interactive UPS system. For line-interactive UPS system, the seemly transition from UPS mode to by-pass mode is an additional requirement. This requirement is also the responsibility of the controller of each ac power supply.

The seemly transition from UPS mode to by-pass mode is realized by take of the advantage of the zero-inertia of the ac power supply. The controller monitors the grid voltage continuously, and compares the grid voltage vector with the ac power supply's voltage vector in the ad frame, when the amplitude and the angle of the two voltage vectors are close enough, say voltage amplitude within 5% difference and angle within 5 degrees, the ac power supply will switch to current mode and takes grid's phase angle as its angle reference while keeping $I_{pref}$, $I_{Qref}$, $I_{Rref}$ and $I_{Sref}$ unchanged for tens milliseconds waiting the close of the main switch. After the main switch closed, the ac power supply will switch to charge mode.

ANNEX 2

```
void inverter_voltage (void) {
/* This voltage source control function works for both parallel and
single operation*/
    /* wait dc-bus voltage be ready */
        if (s.dcbus_v_feedback < MINIMUM_DC_BUS_OPERATION_VOLTAGE) {
            inverter_matrix_off ( );
            return;
    }
    /* after dc-bus is ready, check the inverter terminal voltage. And
find
        the voltage vector's peak and phase angle*/
□
□
        s.inverter_v_alpha = (1.0/3.0) * (s.inverter_vab -
s.inverter_vca);
□
        s.inverter_v_beta = (SQRT3/3.0) * s.inverter_vbc;
        s.inverter_v_peak = sqrt(s.inverter_v_alpha * s.inverter_v_alpha +
                                 s.inverter_v_beta * s.inverter_v_beta);
    /*  there are three possibilities:
□
        (1) allmost zero voltage means no other inverter:
            go to voltage mode directly.
```

-continued

ANNEX 2

```
            (2) voltage exists but not high enough, inverter has to wait
other               inverter to finish transition.
           waiting!
            (3) voltage high enough that means other inverter is operating
in steady          state:
            take the measured voltage vector's angle as inverter's phase
angle              value, and run current mode for one second then go to
voltage mode.
      */ if ( s.inverter_v_peak < ALLMOST_ZERO_VOLTAGE) { /* case (1) */
        s.inverter_mode = VOLTAGE_MODE;   /* directly go to voltage mode
*/
        s.inverter_v_ramp = 0.0;   /* take zero as voltage initial
value */
        inverter_matrix_on( );
    }
    else if ( s.inverter_v_peak < STABLE_VOLTAGE) { /* case (2) */
        return;                                    /* wait */
    }
        else {   /* case (3) */
            s.inverter_mode = CURRENT_START;
            s.inverter_mode = CURRENT_MODE;
            inverter_matrix_on( );
        }
    if ( s.inverter_mode == CURRENT_MODE) {
        s.inverter_i_mode_time++;
        if (s.inverter_i_mode_time >= 1SEC) { s.inverter_i_mode_time = 0;

s.inverter_mode = VOLTAGE_MODE;

s.inverter_v_ramp = s.inverter_vp_a;
            /* for smoothly merge use measured voltage as initial starting
value */

} s.inverter_v_theta = atan(s.inverter_v_beta / s.inverter_v_alpha);

s.inverter_v_2theta = 2 * s.inverter_v_theta;

s.inverter_ia_cmd = 0.0;
        s.inverter_ic_cmd = 0.0;
        s.inverter_ib_cmd = 0.0;

return;

} /* end of current mode */

/* start normal voltage mode */

/* calculate measured feedback voltage in P-Q and R-S frames */ s.inverter_vp_a = s.inverter_cos_theta * s.inverter_v_alpha
                    + s.inverter_sin_theta * s.inverter_v_beta;

s.inverter_vq_a = -s.inverter_sin_theta * s.inverter_v_alpha
                    + s.inverter_cos_theta * s.inverter_v_beta;

s.inverter_vr_a = s.inverter_cos_theta * s.inverter_v_alpha
                    - s.inverter_sin_theta * s.inverter_v_beta;
```

-continued

ANNEX 2

```
    s.inverter_vs_a = -s.inverter_sin_theta * s.inverter_v_alpha
                    - s.inverter_cos_theta * s.inverter_v_beta;
    s.inverter_ip_a = s.inverter_cos_theta * s.inverter_ialpha
                    + s.inverter_sin_theta * s.inverter_ibeta;

/* Calculate voltage vector's angle reference:

s.inverter_v_theta = Nominal part NOMINAL_THETA_STEP
                    + Droop ip-f part s.inverter_theta_comp */
    s.inverter_theta_comp = s.inverter_ip_a * DROOP_IP_F;
    /* DROOP_IP_F = mθ/I_NOMINAL */ s.inverter_theta_v += (NOMINAL_THETA_STEP - s.inverter_theta_comp);

inverter_v_2theta = 2 * s.inverter_v_theta;

cos_2theta = cos(inverter_v_2theta);

sin_2theta = sin(inverter_v_2theta);

/* Vq control loop */

/* set VQ reference = zero */
    s.inverter_vq_ref = 0.0;

/* Vq PI regulator to control Iq reference iq_cmd */ s.inverter_vq_e = s.inverter_vq_ref - s.inverter_vq_a;

s.inverter_vq_ei += VQ_KI * s.inverter_vq_e;

s.inverter_iq_cmd = VQ_KP + s.inverter_vq_e + s.inverter_vq_ei;
    /* Vp control loop */
    /* set Vp reference = Nominal part s.inverter_v_ramp
                    + Droop Iq-V part s.inverter_v_ramp_comp */ if (s.inverter_v_ramp > INVERTER_NOMINAL_VOLTAGE)

s.inverter_v_ramp -= INVERTER_V_RAMP_STEP;
    else if (s.inverter_v_ramp >= INVERTER_NOMINAL_VOLTAGE)
            s.inverter_v_ramp += INVERTER_V_RAMP_STEP);
    s.inverter_v_ramp_comp = DROOP_V_IQ * s.inverter_iq_cmd;
    s.inverter_v_ref = s.inverter_v_ramp + s.inverter_v_ramp_comp;
    /* Vp PI regulator to control Ip reference ip_cmd */
    s.inverter_vp_e = s.inverter_v_ref - s.inverter_vp_a;
    s.inverter_vp_ei += VP_KI * s.inverter_vp_e;
    s.inverter_ip_cmd = VP_KP * s.inverter_vp_e + s.inverter_vp_ei:
    /* Vr control loop */
    /* set Vr reference */
    s.inverter_vr_ref = s.inverter_v_ref * cos_2theta;
    /* Vr PI regulator to control Ir reference ir_cmd */
    s.inverter_vr_e = s.inverter_vr_ref - s.inverter_vr_a;
    s.inverter_vr_ei += VR_KI * s.inverter_vr_e;
    s.inverter_ir_cmd = VR_KP * s.inverter_vr_e + s.inverter_vr_ei;
    /* Vs control loop */
    /* set Vs reference */
    s.inverter_vs_ref = -(s.inverter_v_ref * sin_2theta);
    /* Vs PI regulator to control Is reference is_cmd */
    s.inverter_vs_e = s.inverter_vs_ref - s.inverter_vs_a;
    s.inverter_vs_ei += VS_KI * s.inverter_vs_e;
    s.inverter_is_cmd = VS_KP * s.inverter_vs_e + s.inverter_vs_ei;
    /* Transform the current reference from the P-Q and R-S frame to
alpha-beta frame then to physical a-b-c frame */
  i_alpha_ref = s.inverter_cos_theta * ( s.inverter_ip_cmd +
s.inverter_ir_cmd )
            - s.inverter_sin_theta * ( s.inverter_iq_cmd +
s.inverter_is_cmd );
  i_beta_ref = s.inverter_cos_theta * ( s.inverter_iq_cmd -
s.inverter_is_cmd )
            + s.inverter_sin_theta * ( s.inverter_ip_cmd -
```

-continued

ANNEX 2

```
s.inverter_ir_cmd );
    s.inverter_ia_cmd = ialpha_ref;
    s.inverter_ic_cmd = -0.5 * (ialpha_ref + SQRT3 * ibeta_ref);
    s.inverter_ib_cmd = -s.inverter_ia_cmd - s.inverter_ic_cmd;
}
```

The embodiments of the invention in which an exclusive property or privilege is claimed are defined as follows:

1. The method of supplying AC power having desired voltage, current and frequency characteristics which comprises:
    (a) supplying DC power to an inverter;
    (b) using the inverter to convert the DC power to an inverter output having an inverter output voltage, an inverter output current and an inverter output frequency;
    (c) sensing the inverter output voltage and the inverter output current;
    (d) using the sensed inverter output voltage and the sensed inverter output current to determine the real power current and a predicted required reactive current; and
    (e) using the real power current signal and the predicted reactive power current signal to generate control signals for the inverter to achieve the desired voltage, current and frequency characteristics for the inverter output.

2. The method of supplying AC power having desired voltage and frequency characteristics which comprises:
    (a) supplying DC power to an inverter of voltage source with an inner current-loop;
    (b) using the inverter to convert the DC power to an inverter output having desired voltage and desired frequency;
    (c) sensing the inverter output voltage and the inverter output current;
    (d) using the sensed inverter output voltage to compare with the desired voltage to generate a predicted required reactive current that is used to control the voltage in parallel operation;
    (e) using the sensed inverter output current to compare to the desired current to determine a PWM drive signal;
    (f) using the sensed inverter currents to calculate a real power current signal that is used to control the frequency in parallel operation; and
    (g) using the predicted reactive power current signal and the sensed real power current signal to generate control signals for the inverter in parallel operation to achieve the desired voltage and frequency characteristics for the inverter with inner current loop.

* * * * *

UNITED STATES PATENT AND TRADEMARK OFFICE
CERTIFICATE OF CORRECTION

PATENT NO. : 7,072,195 B2
APPLICATION NO. : 10/505488
DATED : July 4, 2006
INVENTOR(S) : R. Xu Page 1 of 1

It is certified that error appears in the above-identified patent and that said Letters Patent is hereby corrected as shown below:

| COLUMN | LINE | | |
|---|---|---|---|
| 2 | 25 | "diagram and graph of" should read | --diagram of-- |
| 5 | 16 | "$=V_\alpha+jV\Theta$." should read | -- $V_\alpha+jV_\beta$,-- |
| 5 | 32 | "$V_P\text{-}Q=V_P$," should read | --$V_{P\text{-}Q}=V_P$,-- |
| 5 | 42 | "$I_{R\text{-}S=IR}+jI_s$." should read | --$I_{R\text{-}S}=I_{R+}{}^{jI}{}_s$.-- |
| 6 | 21 | "stablitiy" should read | --stability-- |

Signed and Sealed this

Twenty-sixth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,072,195 B2
APPLICATION NO. : 10/505488
DATED : July 4, 2006
INVENTOR(S) : R. Xu It is certified that error appears in the above-identified patent and that said Letters Patent is hereby corrected as shown below:

| COLUMN | LINE | |
|---|---|---|
| 2 | 25 | "diagram and graph of" should read --diagram of-- |
| 5 | 16 | "$=V_\alpha+jV\Theta$." should read -- $V_\alpha+jV_\beta$,-- |
| 5 | 32 | "$V_P$-$Q$=$V_P$," should read --$V_{P-Q}$=$V_P$,-- |
| 5 | 42 | "$I_{R-S=IR}+jI_s$." should read --$I_{R-S}=I_R+jI_S$.-- |
| 6 | 21 | "stablitiy" should read --stability-- |

This certificate supersedes Certificate of Correction issued December 26, 2006.

Signed and Sealed this

Third Day of July, 2007

JON W. DUDAS
*Director of the United States Patent and Trademark Office*